United States Patent
Barrett et al.

(10) Patent No.: US 12,486,025 B2
(45) Date of Patent: Dec. 2, 2025

(54) SURFACE-INTEGRATED ELECTROAERODYNAMIC THRUSTERS

(71) Applicant: Massachusetts Institute of Technology, Cambridge, MA (US)

(72) Inventors: Steven Barrett, Somerville, MA (US); Haofeng Xu, Boston, MA (US); Arthur Brown, Cambridge, MA (US); Nicolas Gomez Vega, Cambridge, MA (US); Nicholas Perovich, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 149 days.

(21) Appl. No.: 18/078,692

(22) Filed: Dec. 9, 2022

(65) Prior Publication Data

US 2023/0322368 A1    Oct. 12, 2023

Related U.S. Application Data

(60) Provisional application No. 63/288,731, filed on Dec. 13, 2021.

(51) Int. Cl.
*B64C 23/00* (2006.01)
(52) U.S. Cl.
CPC .................................. *B64C 23/005* (2013.01)
(58) Field of Classification Search
CPC .............................. B64C 23/005; F03H 1/0037
See application file for complete search history.

(56) References Cited

U.S. PATENT DOCUMENTS 11,192,639 B2 *  12/2021  Llamas Sandin ...... B64D 15/12
2020/0386213 A1   12/2020  Barrett et al.

FOREIGN PATENT DOCUMENTS

EP            3980332 B1    4/2022
WO    WO 2020/247031 A1    12/2020

OTHER PUBLICATIONS

Sato et al., Successively accelerated ionic wind with integrated dielectric-barrier-discharge plasma actuator for low-voltage operation. Sci Rep. Apr. 9, 2019;9(1):5813.
Strobel, Experimental characterization of surface integrated electroaerodynamic thrusters. Massachusetts Institute of Technology. Dep of Aeronautics and Astronautics. 2020.
Xu et al., Higher thrust-to-power with large electrode gap spacing electroaerodynamic devices for aircraft propulsion. J Phys D. Appl Phys. 53(2): 025202.
Xu et al., Flight of an aeroplane with solid-state propulsion. Nature. 2018; 563: 532-5.

* cited by examiner

*Primary Examiner* — Kimberly S Berona
*Assistant Examiner* — Nevena Aleksic
(74) *Attorney, Agent, or Firm* — Wolf, Greenfield & Sacks, P.C.

(57) ABSTRACT

Embodiments disclosed herein relate to electroaerodynamic (EAD) thrusters for use in thrust generation. An EAD thruster may include one or more ion sources, one or more ion collectors, and one or more airfoils. In some embodiments, the one or more of the one or more ion sources and/or ion collectors may be integrated into a surface of the one or more airfoils. The EAD thruster arrangement may also include multiple EAD stages in some embodiments.

15 Claims, 6 Drawing Sheets

FIG. 6B

SURFACE-INTEGRATED ELECTROAERODYNAMIC THRUSTERS

CROSS-REFERENCE TO RELATED APPLICATIONS

This application claims the benefit under 35 U.S.C. § 119(e) of U.S. provisional application Ser. No. 63/288,731, filed Dec. 13, 2021, the disclosure of which is incorporated herein by reference in its entirety.

FIELD

Disclosed embodiments are related to surface integrated electroaerodynamic thrusters and associated methods of thrust generation.

BACKGROUND

Electroaerodynamic (EAD) propulsion, also known as electrohydrodynamic (EHD) propulsion, is a method of generating thrust without any moving parts. EAD thrusters include electrodes configured to function as an ion source or ion collector. A potential difference is applied across the electrodes (i.e., a voltage differential), such that ions produced at the ion source flow towards the ion collector under the action of the resulting electric field. When the ions flow from the ion source towards the ion collector, the ions collide with neutrally charged molecules, generating ionic wind (i.e., thrust).

SUMMARY

In some embodiments, an electroaerodynamic (EAD) thruster arrangement comprising an airfoil and a first and second electrode is provided. In such an embodiment, the first electrode may be integrated with the airfoil while a second electrode may be spaced from the airfoil, and the first electrode may be configured to function as one of an ion source and ion collector while the second electrode may be configured to function as the other of an ion source and ion collector. In some embodiments, the airfoil may also function as a lifting surface.

In some embodiments, an EAD thruster arrangement comprising a plurality of serially arranged EAD stages is provided. In such an embodiment, each stage of the plurality of EAD stages may comprise an ion source and an ion collector, where at least one of the ion source and the ion collector may be integrated with one or more airfoils provided in the thruster arrangement.

In some embodiments, a method of thrust generation using an EAD thruster is provided. The method may include applying a first voltage differential between a first electrode integrated with a first airfoil and a second electrode spaced apart from the first electrode. In some embodiments, the method may further comprise generating ions at one of the first electrode and second electrode, accelerating the ions in a downstream direction, and generating lift with the first airfoil.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Electroaerodynamic (EAD) propulsion may be used to provide thrust without moving parts for applications such as aircraft propulsion. In comparison to alternative modes of aircraft propulsion which may incorporate reciprocating engines or turbine engines for example, EAD propulsion may offer reduced noise during operation, as well as other benefits such as air purification, flow control, and heat transfer enhancement. However, the inventors have recognized that conventional EAD devices include ion sources and ion collectors that are located external to an aircraft wing, and thus, may generate a significant amount of drag during operation.

In view of the above, the inventors have recognized benefits associated with integrating one or more ion sources and/or one or more ion collectors of an EAD thruster arrangement into the surface of a wing, where the wing may be configured to function as a lifting surface for an aircraft. In such an arrangement, the inventors have appreciated that one or more ion sources and/or one or more ion collectors of the EAD thruster may also be spaced from the surface of the wing. Each of the ion sources and/or ion collectors may comprise one or more electrodes. For example, a first electrode may be provided in the surface of the wing and a second electrode may be spaced from the wing, where the first electrode functions as an ion collector and the second electrode functions as an ion source or vice versa. A voltage differential may then be provided between the two electrodes to generate ions from the ion source and/or accelerate the ions in a downstream direction towards the ion collector, thereby producing thrust in the form of ionic wind. As is expanded upon herein, integration of one or more ion sources and/or one or more ion collectors in the surface of a wing provides several advantages including reduced drag, mass reduction, and simplicity due to the use of fewer structural components. In some embodiments, the inventors have found that surface integration of the ion sources and/or ion collectors may provide a reduction in drag on the order of 5-15%. Although this range of drag reduction is disclosed, reduction in drag resulting from surface integration may be variable depending on the airframe design that is used.

The inventors have further appreciated that positioning one or more ion sources of an EAD thruster within the boundary layer of a wing may result in increased performance and efficiency during thruster use. Specifically, such a configuration may result in a reduction in drag since the wake of the boundary layer may comprise turbulent fluid having a lower dynamic pressure relative to the freestream, thereby resulting in a reduced amount of pressure drag.

In some embodiments, an EAD thruster may include a single stage comprising one or more ion sources and one or more ion collectors, where the ion sources are configured to generate ions which then flow towards the ion collectors. In some embodiments of a single stage EAD thruster, only one ion source and one ion collector may be included, and each of the ion source and ion collector may take the form of an electrode. In other embodiments, however, more than two electrodes may be provided with a number of different arrangements may be used as described further in relation to the figures.

The inventors have also recognized benefits associated with providing multi-stage EAD thrusters comprising two or more stages of ion source and ion collector pairs. The use of multi-stage EAD thrusters may improve performance of the EAD device by providing more thrust in the form of increased ionic wind generation. In some embodiments, the two or more stages may be arranged such that the stages are serially positioned along the length of the EAD thruster. In some embodiments, the two or more stages may also be arranged such that the stages are positioned in parallel to one another (e.g. the one or more ion sources and/or ion collectors may be aligned in a plane parallel to a nominal direction of thrust). In some embodiments, the stages may be arranged in both a serial and parallel manner, as the disclosure is not limited in this regard. An EAD thruster may also include a plurality of wings as well as a plurality of ion source and ion collector pairs. The wings, ion sources, and ion collectors may be arranged in a serial and/or parallel configuration, or any other suitable manner as the disclosure is not so limited.

In view of the above, the inventors have recognized that benefits may be realized by providing an EAD thruster with multiple stages, wherein at least one of the stages is integrated into one or more airfoils configured to function as a lifting surface provided in the thruster arrangement. Such an arrangement may be referred to herein as a multi-staged surface integrated (MSI) thruster. The inventors have found that such an arrangement may reduce drag and improve the thrust produced by the EAD thrusters. For example, a first ion source and ion collector pair and a second ion source and ion collector pair may be provided in an EAD thruster arrangement. At least one of the ion source and/or ion collector of the first and/or second pair may be integrated into an airfoil configured to function as a lifting surface to reduce drag. While this specific arrangement is disclosed herein, an MSI thruster may comprise any suitable number of stages arranged serially and/or in parallel. An MSI thruster may also comprise any suitable number of ion sources and/or ion collectors in each stage, and any number of the ion sources and/or collectors may be integrated into one or more airfoils configured to function as a lifting surface provided in the thruster arrangement, as the disclosure is not limited in this regard.

In some embodiments disclosed herein, a stage may include only one ion source and only one ion collector. In other embodiments, however, a plurality of ion sources and/or ion collectors may be included in one or more stages of an EAD thruster. In some embodiments, an EAD thruster may include a plurality of ion sources and a corresponding plurality of ion collectors. For example, an EAD thruster may include greater than or equal to 2, 3, 4, 5, 10, 100, IWO, and/or any other appropriate number of ion sources and/or ion collectors. While certain ranges of numbers of ion sources and ion collectors are disclosed herein, any suitable number of ion sources and ion collectors may be included in a single stage or a plurality of stages of an EAD thruster as the disclosure is not so limited. Thus, EAD thrusters including a number of ion sources and/or ion collectors that is greater than or less than those noted above are also contemplated as the disclosure is not so limited.

In some embodiments, an aircraft may include any suitable number of EAD thrusters including 1, 2, 3, 4, 5, or more thrusters as the disclosure is not limited in this regard. An EAD thruster may include also include any suitable number of stages including 1, 2, 3, 4, 5, or more stages. In some embodiments, an EAD thruster may include only one stage, although multiple stages may also be used as disclosed herein.

As disclosed herein, an ion source may be generally configured to generate ions and an ion collector may be generally configured to accelerate the generated ions in a downstream direction. In this process, the ions may collide with neutrally charged molecules to generate thrust. The inventors have appreciated that any suitable method and/or arrangement of ion sources and ion collectors may be used including corona discharge and/or dielectric barrier discharge (DBD) arrangements as discussed further below. However, while these specific ion generation methods are disclosed, any suitable method of ion generation and acceleration may be used as the disclosure is not so limited.

The embodiments of EAD thrusters disclosed herein may be used in any suitable application where it is beneficial for an airfoil to function as a lifting surface and where it is desirable to generate thrust. For example, potential applications for EAD thrusters may include aircraft such as fixed-wing aircraft and unmanned aerial vehicles (UAVs) such as drones.

As used herein a wing may refer to an airfoil that is configured to function as a lifting surface during operation of an aircraft as the aircraft travels through the air. Thus, these terms and other similar phrases may be used interchangeably with one another in the various embodiments disclosed herein.

Turning to the figures of the present invention, specific non-limiting embodiments of the invention are described in further detail. It should be understood that the various systems, components, features, and methods described relative to these embodiments may be used either individually and/or in any desired combination as the disclosure is not limited to only the specific embodiments described herein.

Figure 1:
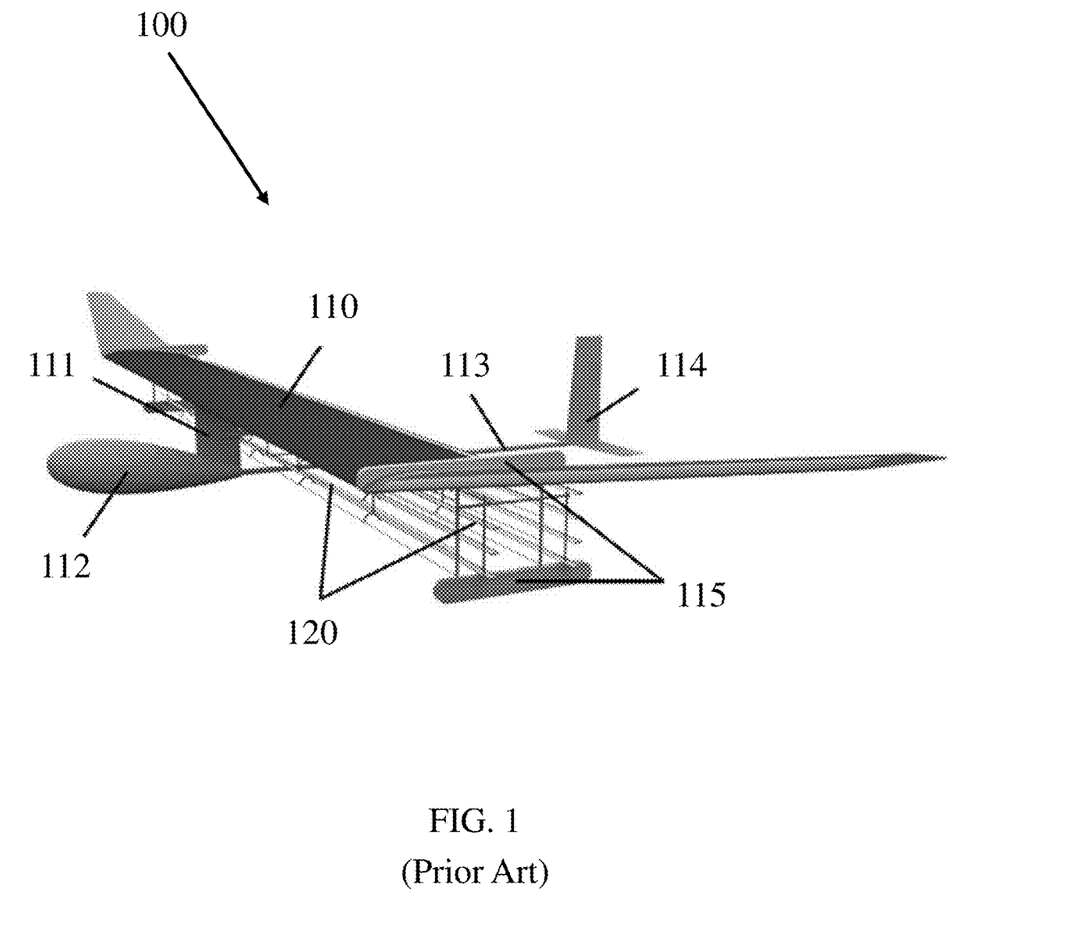
FIG. 1 presents a prior art perspective illustration of an aircraft comprising electroaerodynamic thrusters, according to some embodiments.
Figure 2:
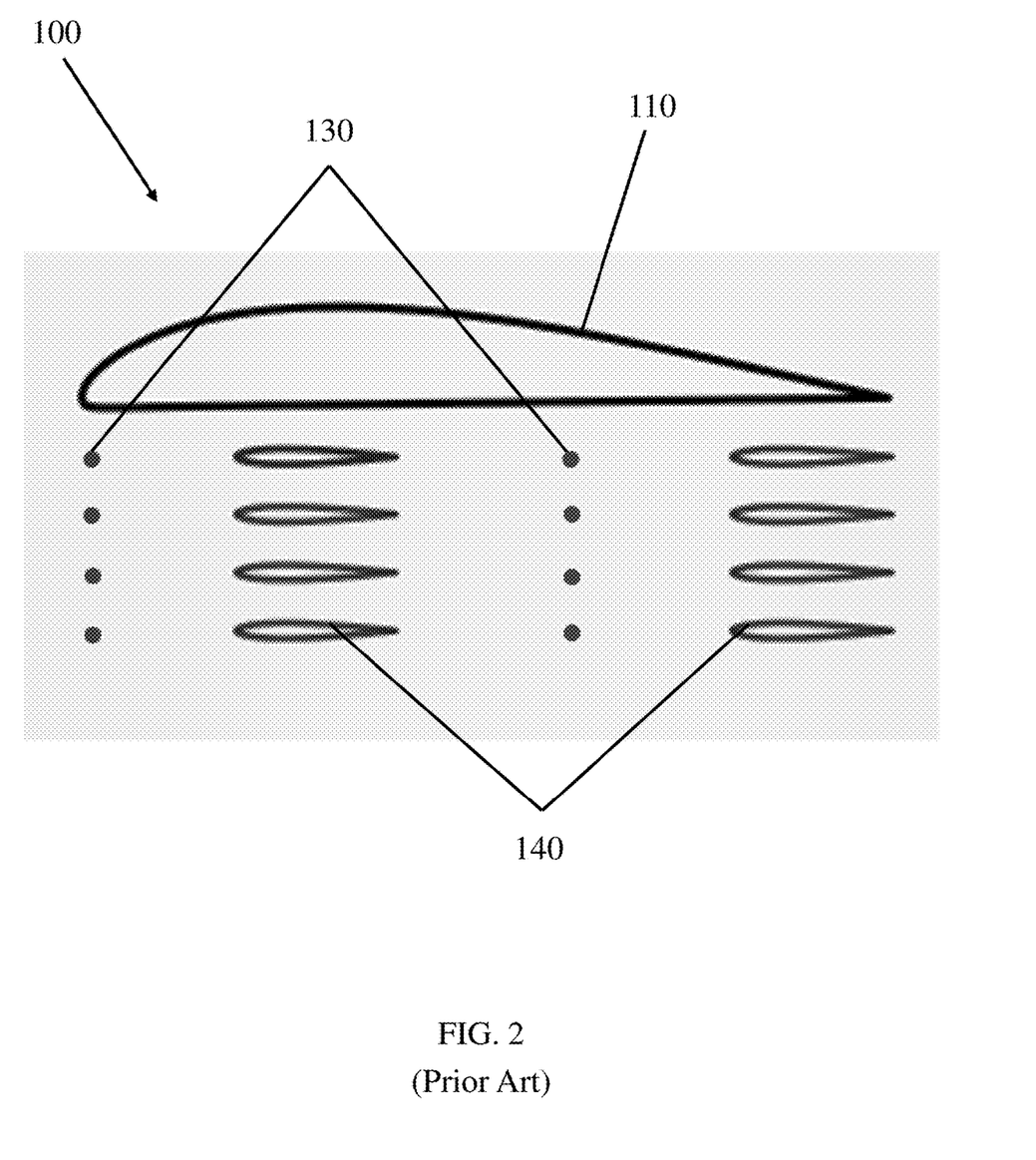
FIG. 2 presents a prior art side view illustration of the wing and thruster array of FIG. 1.

FIG. 1 presents one embodiment of a prior art aircraft including separate EAD thrusters. The aircraft 100 includes a wing 110 and a wing pylon 111 affixed to the wing 110. A fuselage pod 112 is in turn affixed to the wing pylon 111. The aircraft 100 further includes a tail boom 113, a tail 114, and side struts 115. The aircraft 100 also includes a thruster array 120. The thruster array 120 comprises a plurality of ion sources 130 and a plurality of ion collectors 140, as is seen in the prior art embodiment of FIG. 2 which depicts a side view of the wing and thruster array of FIG. 1. The ion sources 130 and ion collectors 140 of this prior art aircraft configuration are entirely external to the wing 110, and thereby generate significant amounts of drag which may affect the overall efficiency and thrust capacity of the overall aircraft. Specifically, the inventors have found that in such a configuration, the ion sources and ion collectors may generate approximately 40% of the total drag of the aircraft.

Figure 3A:
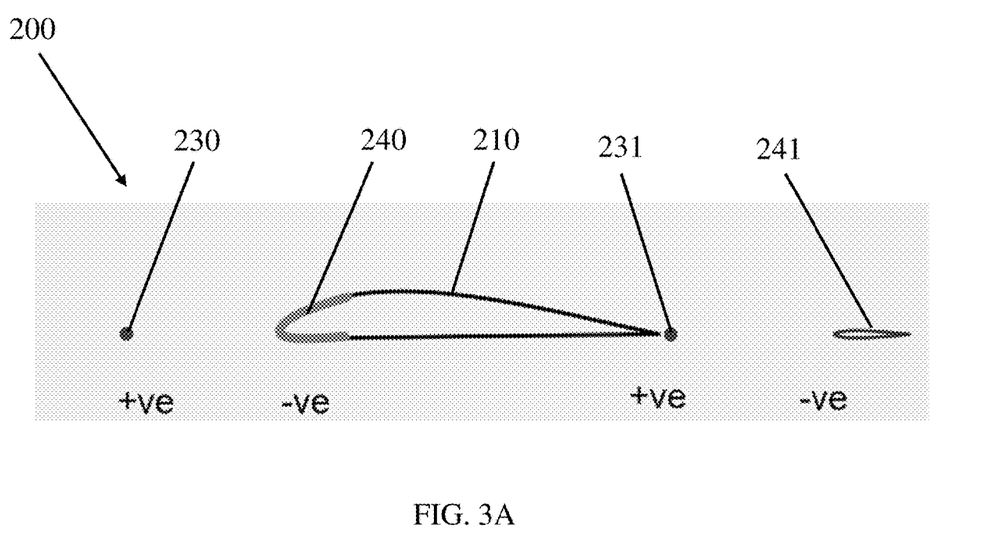
FIG. 3A presents a schematic illustration of an electroaerodynamic thruster and wing arrangement, according to some embodiments.

FIG. 3A presents a schematic illustration of an electroaerodynamic (EAD) thruster and wing arrangement 200 comprising two stages and further comprising an ion collector integrated into the surface of the wing which may also be referred to as an airfoil configured to function as a lifting surface. Additionally, instances in which an ion generator is integrated into an airfoil configured to function as a lifting surface are also contemplated. As disclosed above, the inventors have recognized that integrating ion sources and/or ion collectors into the wing of a thruster arrangement may reduce drag and that providing multiple stages may provide increased thrust output. The depicted thruster and wing arrangement 200 includes a first stage positioned near the leading-edge of the wing 210 comprising an ion source 230 and an ion collector 240. The ion collector 240 is integrated into the leading-edge of the wing such that the leading-edge of the wing functions as a collecting surface whereas the ion source 230 is spaced upstream from the ion collector 240 and the leading-edge of the wing. The thruster and wing arrangement 200 may also include a second stage positioned near the trailing-edge of the wing 210 comprising a second ion source 231 and a second ion collector 241. The ion source 231 may be positioned proximate to and downstream from the trailing-edge of the wing 210 while the ion collector 241 may be spaced downstream from the ion source 231. In some embodiments, the ion source 231 may be integrated into the trailing-edge of the wing 210 while in other embodiments the ion source 231 may be positioned within the boundary layer of the wing 210. The ion collector 241, and/or any of the other separate electrodes disclosed herein may also be integrated into separate airfoils as shown in this embodiment. Additionally, in some embodiments, these separate airfoils may also be configured to function as lifting surfaces. However, embodiments in which one or more of the secondary airfoils are not configured to function as a lifting surface are also contemplated. For example, an airfoil disposed downstream from a primary wing may be of a smaller or equal size to the main wing and may or may not be configured to function as a lifting surface. Of course, while the embodiment of FIG. 3A presents a dual-stage EAD thruster arrangement, in some embodiments, a thruster arrangement may only comprise one stage or may comprise more than two stages as the disclosure is not so limited.

The ion sources and ion collectors provided in the embodiment of FIG. 3A comprise electrodes, where a voltage differential may be applied across the electrodes to generate ions at the ion source which then flow to the respective ion collector under the influence of the resulting electric field. The flowing ions may collide with neutrally charged molecules, in turn generating thrust in the form of ionic wind. In FIG. 3A, the polarity for each of the ion sources and ion collectors in each of the leading-edge and trailing-edge stages is shown. The first stage provided at the leading-edge of the wing has a positively charged ion source and a negatively charged ion collector. Similarly, the second stage provided at the trailing-edge of the wing has a positively charged ion source and a negatively charged ion collector. In such a configuration, ions generated at the positively charged ion sources may flow to the respective negatively charged ion collectors to produce ionic wind. While these specific polarities are shown to correspond to the ion sources and ion collectors in the embodiment of FIG. 3A, the ion sources and ion collectors may have different polarities in other thruster arrangements as the disclosure is not so limited.

In some embodiments, a main wing provided in an EAD thruster arrangement may have a variety of suitable geometries depending on the aircraft type. Accordingly, the wing may have a variety of appropriate chord lengths (i.e. the distance from the leading edge to the trailing edge of the airfoil) which may include, but are not limited to greater than or equal to 10 mm, greater than or equal to 50 mm, greater than or equal to 100 mm, greater than or equal to 1,0000 mm, greater than or equal to 10,000 mm, or any other suitable chord length. The wing may also be of any suitable thickness, including but not limited to greater than or equal to 5 mm, greater than or equal to 10 mm, greater than or equal to 50 mm, greater than or equal to 100 mm, greater than or equal to 1,000 mm, or any other suitable thickness. In some embodiments, the wing may be of a symmetric profile. In other embodiments, however, the wing may be of an asymmetric profile. The wing may also be of any suitable camber, aspect ratio, or any other suitable geometrical parameter as the disclosure is not so limited.

In reference to the first stage of a dual-stage EAD thruster, in some embodiments, an ion source may be positioned upstream from an ion collector which may be integrated into the surface of a wing as shown in FIG. 3A. While only one ion source and ion collector are shown in the first stage of FIG. 3A, a plurality of ion sources and/or ion collectors may be integrated with the wing. Accordingly, the one or more ion sources and/or one or more ion collectors provided in a stage may be spaced from one another in any suitable direction and distance. This may include spacings between electrodes integrated into a single airfoil and/or between an electrode spaced apart from an airfoil including an integrated electrode. In some embodiments, an ion source and ion collector are spaced from one another by a distance greater than or equal to 1 mm, greater than or equal to 2 mm, greater than or equal to 3 mm, greater than or equal to 5 mm, greater than or equal to 10 mm, greater than or equal to 100 mm, greater than or equal to 1,000 mm, or any other suitable distance. The inventors have recognized that while any suitable distance between an ion source and an ion collector may be used as described above, that spacings between 5 mm and 300 mm may serve to be particularly beneficial for the generation of ionic wind. In some embodiments, ion generation by one or more ion sources may also be at least partially decoupled from the ion acceleration by one or more ion collectors in one or more stages of an EAD thruster arrangement.

Ion sources used in the various embodiments of EAD thrusters disclosed herein may be of any suitable type as the disclosure is not so limited. Types of ion sources may include, but are not limited to wires, point sources, pins, and one or more conductive surfaces of an airfoil. In some embodiments, a plurality of ion sources may be provided of the same or varying type. For example, a stage of an EAD thruster arrangement may be provided having a plurality of pins each configured to function as an ion source arranged in parallel to one another and positioned upstream from a wing including one or more conductive surfaces configured to function as an ion collector. Of course other types of ion sources may also be used as the disclosure is not limited to the type of ion sources used.

Ion collectors used in EAD thrusters may also be of any suitable type as the disclosure is not so limited. Types of ion collectors may include, but are not limited to one or more conductive surfaces of an airfoil, mesh, grids, cylinders, wires, or any other suitable type.

The ion sources and/or collectors may further have any suitable size, shape, or other characteristic. For example, an ion source and/or ion collector may have a circular or a non-circular cross-section and may be of any suitable cross-sectional dimensions. In some embodiments, a suitable cross-sectional dimension (e.g. diameter) of an ion source and/or ion collector may be greater than or equal to 1 micron, greater than or equal to 5 microns, greater than or equal to 10 microns, greater than or equal 100 microns, greater than or equal to 1,000 microns, greater than or equal to 10,000 microns, or any other suitable size. The inventors have appreciated that a suitable cross-sectional dimension of an ion source and/or ion collector may also be variable depending on the type of ion source and/or ion collector used. For example, for a wire type ion source, a suitable cross-sectional dimension may be between 0.001 mm and 1 mm in diameter. Of course different dimensions both greater and/or less than those noted above are also contemplated.

As noted above, an ion source and/or an ion collector may comprise one or more electrodes which may be of any suitable size, shape, or other suitable characteristic. The one or more electrodes may be configured for use in corona discharge, dielectric barrier discharge, or other suitable methods of ion formation. In some embodiments, an ion source may comprise a plurality of electrodes as disclosed herein. For example, an ion source may comprise two electrodes which may be of a different potential. In such an arrangement, applying a voltage differential between any of the ion source electrodes and/or one or more ion collector electrodes may assist in accelerating the ions downstream to promote generation ionic wind, as is described in further detail below.

The electrodes disclosed herein may also have any appropriate shape including, but not limited to, spheres, plates, wires, cylinders, tubes, prisms, airfoils, and/or any other suitable shape. In some embodiments, the electrodes may also be of an elongated shape such that the longitudinal dimension of the electrode is substantially greater than that of the transverse dimension of the electrode. Such a configuration may provide simplified manufacturing, reduced drag, and reduced weight relative to other configurations of electrodes. Of course, any suitable arrangement of the electrodes may be provided.

In some embodiments, the electrodes may be coated with a conductive material disposed on an insulating substrate material to permit conduction of voltage and currents that may be applied to the electrodes for use in generating and accelerating ions. Examples of conductive material that may coat the electrodes include, but are not limited to aluminum, copper, carbon fiber, gold, or any other suitable conductive material as the disclosure is not limited in this regard. The electrodes may also be at least partially coated with dielectric material for use in embodiments using dielectric barrier discharge. The inventors have appreciated that the incorporation of dielectric material may prevent arcing of the electrodes of an EAD thruster. Examples of dielectric material that may be used include, but are not limited to fluoropolymer compounds, glasses, fiberglass composites, polymides, or any other suitable dielectric material as the disclosure is not limited in this regard. The electrodes may be coated with the aforementioned materials in any suitable thickness as needed to provide sufficient conduction to the electrodes. In some embodiments, the electrodes have no coating.

As disclosed above, the inventors have recognized that integrating an ion collector into the surface of a wing such that the wing functions as a collecting surface may serve to reduce drag, as shown in the first stage of FIG. 3A. The wing may include conductive material on one or more portions of a surface of the wing to provide sufficient conductivity to permit the one or more portions of the wing to function as an ion collector and/or ion source. For example, the leading edge of the wing may be covered in or manufactured from a conductive material including, but not limited to aluminum, copper, carbon fiber, gold, or any other suitable conductive material. In some embodiments, an electrode corresponding to a conductive portion of the wing may include greater than or equal to 5%, greater than or equal to 10%, greater than or equal to 20% greater than or equal to 50%, greater than or equal to 75%, equal to 100%, or any other suitable amount of a surface area of the wing as the disclosure is not so limited. In instances in which multiple electrodes are included in a single wing, the wing may include separate conductive portions of the surface of the wing that are electrically isolated from one another by insulating material disposed between these conductive portions of the wing surface.

In some embodiments, a voltage differential may be applied between any number of the one or more ion sources and the one or more ion collectors to generate ions and accelerate the ions in a downstream direction, thereby producing ionic wind. Specifically, a voltage differential may be applied between one or more electrodes corresponding to an ion source and one or more electrodes corresponding to an ion collector. The inventors have recognized that the applied voltage differential may be of any suitable voltage amount that is sufficient to generate and to accelerate the ions. In some embodiments, a suitable applied voltage differential may include greater than or equal to 1 kilovolt, greater than or equal to 10 kilovolts, greater than or equal to 100 kilovolts, greater than or equal to 500 kilovolts, or any other suitable voltage. The inventors have additionally recognized that a suitable applied voltage differential may be at least partially dependent on the distance between the one or more ion sources and one or more ion collectors. For example, a shorter spacing distance (e.g. 5 mm between electrodes) may permit use of a lower voltage differential (e.g. 1 kilovolt). While this specific example is disclosed, any appropriate voltage differential may be used for any electrode spacing as the disclosure is not so limited.

Figure 3B:
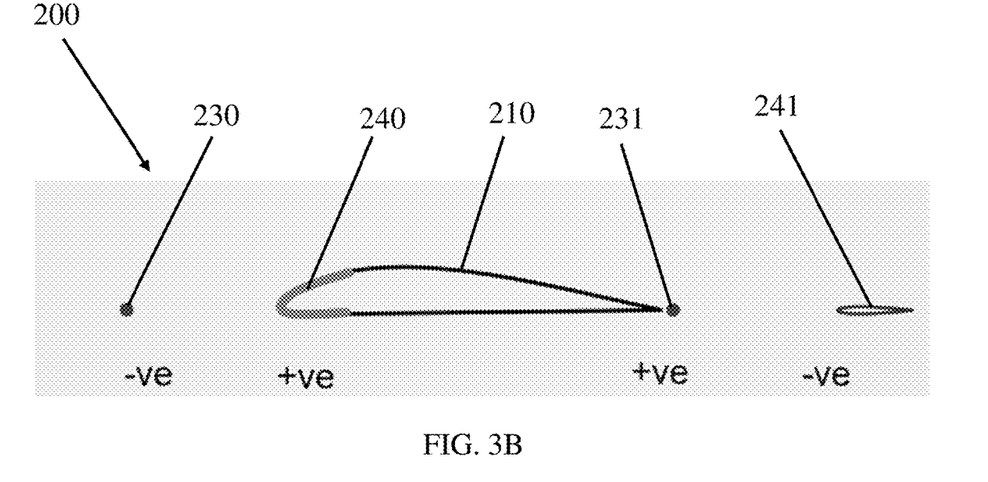
FIG. 3B presents a schematic illustration of an electroaerodynamic thruster and wing arrangement, according to some embodiments.

As noted above, in some embodiments, one or more ion sources and/or ion collectors may be disposed in the wake of the main wing, or other airfoil, to reduce drag since the wake of the boundary layer may experience reduced pressure drag resulting from lower pressure turbulent fluid that may be present in the wake, see electrode 231 in FIGS. 3A and 3B. In some embodiments, one or more ion sources may be positioned proximate to, or at, a trailing-edge of the wing such that the ion sources are integrated into the surface of the wing. In other embodiments, however, one or more ion sources may not be integrated into the surface of the wing, but may instead be positioned in the wake of the boundary layer and spaced downstream from the trailing-edge point of the wing. In some embodiments, a suitable spacing to retain one or more ion sources within the wake of the boundary layer may include greater than or equal to 0.1 mm, greater than or equal to 1 mm, greater than or equal to 2 mm, greater than or equal to 3 mm, greater than or equal to 10 mm, greater than or equal to 20 mm, greater than or equal to 50 mm, greater than or equal to 100 mm, or any other suitable spacing such that the ion sources are retained within the wake of the boundary layer depending on the size of the wing and operating conditions of the aircraft.

The one or more ion sources may additionally be offset at a specified height relative to the main wing. In some embodiments, a suitable displacement of the one or more ion sources positioned above and/or below the height of the wing may include, but is not limited to greater than or equal to 0.1 mm, greater than or equal to 1 mm, greater than or equal to 2 mm, greater than or equal to 3 mm, greater than or equal to 10 mm, greater than or equal to 50 mm, or any other suitable spacing such that the ion sources are retained within the wake of the boundary layer.

The inventors have also recognized that a boundary layer of the wing may be variable in size and/or shape depending on cruise conditions for a given type of aircraft such that in some configurations the one or more ion sources and/or one or more ion collectors may or may not be positioned within the boundary layer during flight. Thus, the presence of an electrode being located within a boundary layer and/or wake of an airfoil may be determined based on the designed cruise conditions of the particular aircraft in question which may vary from large, fixed-wing aircraft to drones.

While embodiments related to electrodes of ion collectors and/or ion sources being located within a boundary layer and/or wake of an airfoil are described above, in some embodiments, the one or more ion sources and/or one or more ion collectors may be positioned outside of the boundary layer of the wing.

As disclosed above, ion sources and/or ion collectors may comprise electrodes which are sufficiently conductive such that voltages and currents may be applied to the electrodes. The electrodes of the ion sources and ion collectors may be configured such that they are each positively or negatively charged, where a positive charge may result from being in electrical connection with a high voltage power source and a negative charge may result from being grounded, or vice versa. Upon the application of voltage differentials to the electrodes of the one or more ion sources and one or more ion collectors, ions may be generated at the ion sources which flow to the ion collectors. In the embodiment of FIG. 3A, the first stage at the leading-edge of the wing has a positively charged ion source 230 and a negatively charged ion collector 240 in the form of a wing integrated collecting surface while the second stage at the trailing-edge of the wing has a positively charged ion source 231 and a negatively charged ion collector 241. The polarity arrangement of FIG. 3A may result in the backflow of ions generated at the trailing-edge ion source to the leading-edge ion collector, resulting in a phenomenon known as counter-ionic wind. Counter-ionic wind may have several negative effects including, but not limited to increased power draw and reduced thrust output from the thruster arrangement. The inventors have recognized that the effects of counter-ionic wind may be reduced by increasing wing size to reduce backflow of ions from the trailing-edge to the leading-edge. However, depending on the application, increasing the wing size may not be practical.

In view of the above, the inventors have found that it may be beneficial to alternate the polarity of successive stages provided in an EAD thruster arrangement as such a configuration may reduce or eliminate the occurrence of counter-ionic wind. FIG. 3B presents a schematic illustration of an EAD thruster and wing arrangement 200 comprising two stages. The thruster and wing arrangement 200 includes a first stage positioned near the leading-edge of the wing 210 comprising an ion source 230 and an ion collector 240. The ion collector 240 is integrated into the leading-edge of the wing such that the leading-edge of the wing functions as a collecting surface whereas the ion source 230 is spaced upstream from the ion collector 240. The thruster and wing arrangement 200 also includes a second stage positioned near the trailing-edge of the wing 210 comprising an ion source 231 and an ion collector 241. The ion source 231 is positioned near the trailing-edge of the wing 210 while the ion collector 241 is spaced downstream from the ion source 231. In some embodiments, the ion source 231 may be integrated into the trailing-edge of the wing 210 while in other embodiments the ion source 231 may be positioned within the boundary layer of the wing 210. The ion collector 241 is also shown as an airfoil in this embodiment, which may additionally serve as a lifting surface in some embodiments.

While the embodiment of FIG. 3B is spatially similar to that of FIG. 3A, the polarity of the first stage of the MSI thruster arrangement in FIG. 3B is alternated such that the first stage comprises a leading-edge thruster producing negative ions and the second stage comprises a trailing-edge thruster producing positive ions. The inventors have found that in such a configuration where the polarity of separate, serially arranged stages are alternated in a downstream direction may reduce or eliminate the occurrence of counter-ionic wind since the downstream ion source has the same polarity as the upstream ion collector, thereby reducing the backflow of ions.

In yet another embodiment, the inventors have also recognized that the polarity may remain the same between successive stages of an EAD thruster arrangement and that instead the voltage differential applied between one or more ion source electrodes and one or more ion collector electrodes may be successively increased between stages to address counter-ionic wind. For example, in reference to the embodiment of FIG. 3A, voltage differentials may be applied in a successively increasing manner across the following pairs of ion sources and ion collectors: the leading-edge ion source 230 and the integrated ion collector 240, the integrated ion collector 240 and the trailing-edge ion source 231, and the trailing-edge ion source 231 and the trailing-edge collector 241. The inventors have found that by using increasing voltage differentials of the same polarity for successive stages, that backflow of ions may be reduced as there is a greater influence under the resulting electric field for ions to flow downstream to the successive ion source or ion collector.

In some embodiments, the polarity between successive stages of an EAD thruster may remain the same and the voltage potential across the ion sources and ion collectors integrated in the wing may also remain the same. In such embodiments, the applied voltage differential may be successively increased between the ion sources and ion collectors not integrated into the surface of the wing. For example, in a thruster arrangement with a first stage ion source positioned upstream from the leading-edge of a wing and a second stage ion collector positioned downstream from the trailing-edge of the wing, the applied voltage differential may be increased between the first stage ion source and the second stage ion collector.

While certain arrangements of applied voltage differentials are disclosed relative to the above embodiments, any suitable arrangement and/or magnitude of voltage differentials may be applied to any configuration of ion sources and/or ion collectors provided in any number of stages of an EAD thruster to assist in generating ions and accelerating the ions downstream to produce ionic wind as the disclosure is not limited in this regard.

Figure 4:
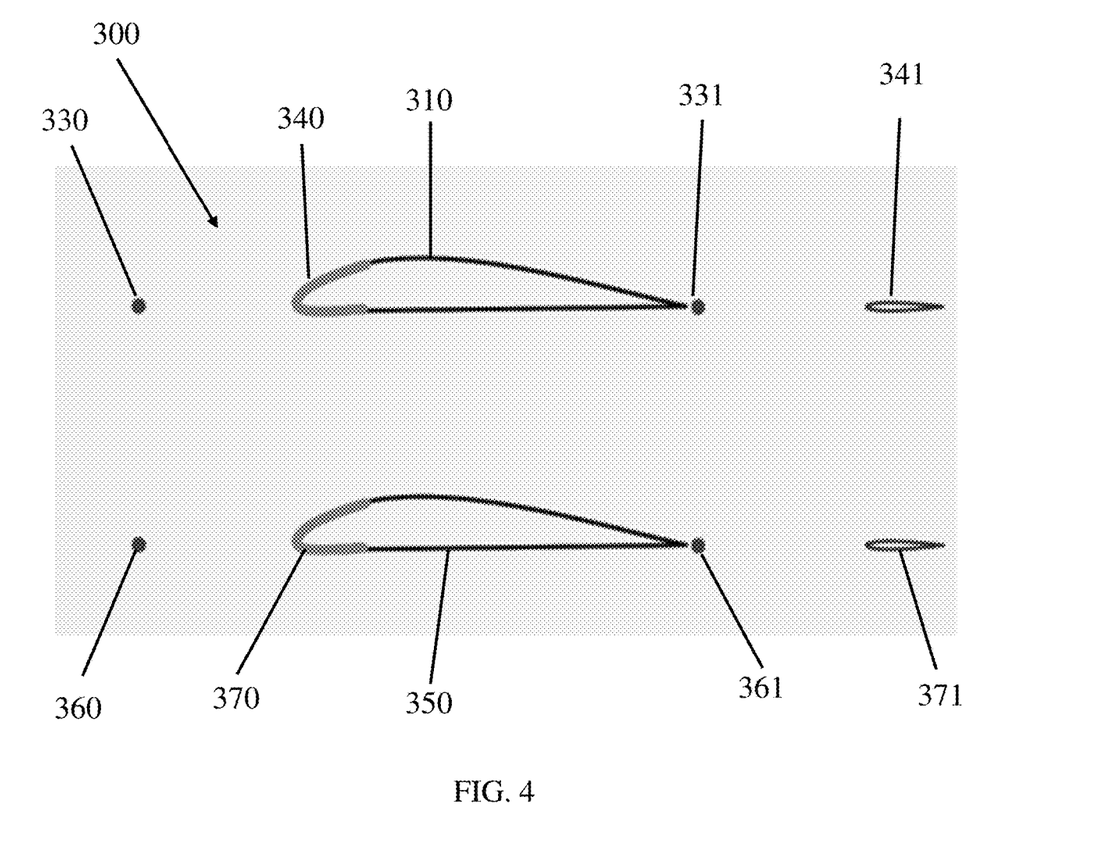
FIG. 4 presents a schematic illustration of an electroaerodynamic thruster and wing arrangement, according to some embodiments.

FIG. 4 presents a schematic illustration of an EAD thruster and wing arrangement 300 comprising two wings each having two stages disposed in parallel to one another. This may be referred to herein as a biplane configuration. The two wings are further shown as being oriented substantially parallel to one another. The first wing 310 comprises a first stage having an ion collector 340 integrated into the leading-edge of the wing and an ion source 330 spaced upstream from the ion collector 340. The first wing 310 also comprises a second stage having an ion source 331 positioned near the trailing-edge of the wing 310 and an ion collector 341 spaced downstream from the ion source 331. The second wing 350 comprises a first stage having an ion collector 370 integrated into the leading-edge of the wing and an ion source 36) spaced upstream from the ion collector 370. The second wing 350 also comprises a second stage having an ion source 361 positioned near the trailing-edge of the wing 350 and an ion collector 371 spaced downstream from the ion source 361. In some embodiments, ion source 331 and/or ion source 361 may be integrated into the trailing-edge of their respective wings while in other embodiments at least one of ion sources 331 and 361 may be positioned within the boundary layer of their respective wings. The ion collectors 341 and 371 are also shown as an airfoil in this embodiment, and at least one of these collectors may additionally serve as a lifting surface. While this specific arrangement in FIG. 4 is disclosed, any number of ion sources, ion collectors, and wings may be provided in an EAD thruster which may also be arranged in any suitable manner as the disclosure is not limited in this regard.

In reference to FIG. 4, the polarity of stages of the biplane arrangement may correspond to any of the voltage differential arrangements disclosed previously above.

Figure 5:
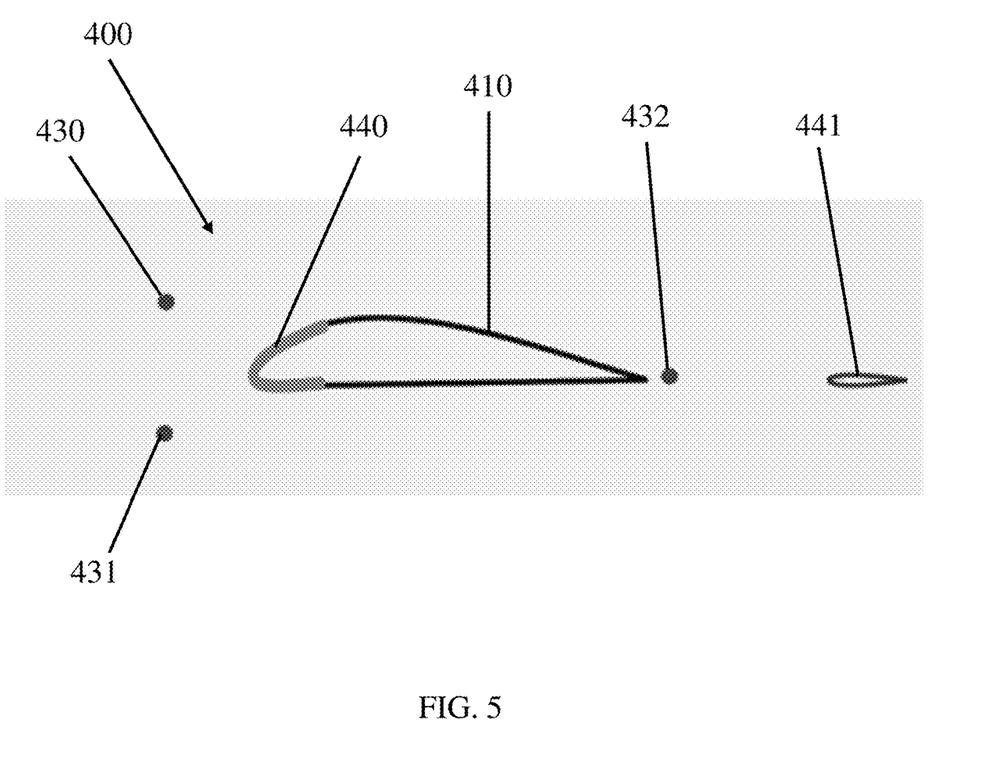
FIG. 5 presents a schematic illustration of an electroaerodynamic thruster and wing arrangement, according to some embodiments.

As noted previously, in some embodiments, it may be desirable to decouple the generation and acceleration of ions within an EAD thruster. In such an embodiment, one or more ion sources of the thruster may use a dielectric barrier discharge between first and second ion source electrodes to form ions during operation which then flow downstream towards a third collector electrode to generate ionic wind. FIG. 5 presents a schematic illustration of an EAD thruster and wing arrangement 400 comprising two stages and a dielectric barrier discharge based ion source. The thruster and wing arrangement 400 includes a first stage positioned near the leading-edge of the wing 410 comprising an ion source having a first electrode 430 and a second electrode 431 arranged substantially parallel to one another and positioned upstream from the leading-edge of the wing 410. While the ion source electrodes are shown in FIG. 5 as being arranged substantially parallel to one another, the ion source electrodes may be spaced from one another in any appropriate direction and at any suitable distance as the disclosure is not limited in this regard. For example, the first and second electrode may be offset from one another in a direction that is at least partially perpendicular to a downstream direction of the thruster. The first stage may also comprise an ion collector 440 which is integrated into the leading-edge of the wing 410 and is configured to function as a collecting surface. The ion collector 440 in this configuration takes the form of a third electrode. The arrangement 400 may additionally include a second stage comprising an ion source 432 positioned in the wake of the wing boundary layer and an ion collector 441 spaced downstream from the ion source 432. In the embodiment of FIG. 5, as disclosed above, the three-electrode arrangement may be constructed such that the two ion source electrodes are configured to generate ions via wire-to-wire dielectric barrier discharge which are then accelerated downstream to the third collector electrode 440 to produce ionic wind.

In reference to the arrangement of FIG. 5, a first power source may be electrically connected to the ion collector 440. The first power source may be a negative or positive power supply as the disclosure is not limited to the specific magnitude or directionality of the voltage differentials applied to the electrodes. The second electrode 431 and a second power source may also be electrically connected to the ground or other common potential. Separately, the second power source may be electrically connected to the first electrode 430. A first time-varying voltage, $V_{AC}$, may be applied to first electrode 430 relative to second electrode 431 and the ground or other common potential. A second voltage, $V_{DC}$, which may be a substantially constant voltage, may be applied to the third collector electrode 440 relative to the ground or other common potential. Additionally, a ground voltage, $V_G$, may be applied to second electrode 431 by the ground or other common potential, though embodiments in which a capacitor is electrically connected in series between the second electrode 431 and the ground or other common potential are also contemplated, in which case, the voltage applied to the second electrode 431 would be a combination of $V_G$ and a voltage of the capacitor $V_{Cap}$.

In view of the above, a time-varying voltage differential may be applied between the first electrode 430 and second electrode 431 which may cause the fluid located between the electrodes to ionize via dielectric barrier discharge as the voltage cyclically changes during operation. This voltage differential may correspond to a difference between the voltage applied to the first electrode $V_{AC}$ by the second power source and the combination of the ground voltage $V_G$ and the capacitor voltage $V_{Cap}$ where present. Given the large voltage difference between ion collector 440 and ion source electrodes 430 and 431 used to accelerate the ions, the voltage differential used for accelerating the ions may be approximated as the second voltage $V_{DC}$ or an average of the difference between the voltage of ion collector 440 with first electrode 430 and second electrode 431. However, a more specific voltage differential between the first electrode 330 and the third collector electrode 440 may correspond to the difference between $V_A c$ and $V_{DC}$. Similarly, the voltage differential between the second electrode 431 and the third collector electrode 440 may correspond to the difference between $V_{DC}$ and the combination of the ground voltage $V_G$ and capacitor voltage $V_{Cap}$. These applied voltage differentials between the first electrode and third electrode as well as the second electrode and third electrode may serve to accelerate the ions in a downstream direction to generate ionic wind.

In some embodiments, the voltage differential applied to the electrodes to form ions via suitable ion generation methods may be the same voltage differential used to accelerate the ions for thrust generation. Using the same resulting electric field may reduce complexity and weight of the system. In other embodiments, however, the voltage differential applied to the electrodes to form ions may be different than the voltage differential used to accelerate the ions for thrust generation as may be the case in the embodiment of FIG. 5.

The following examples are intended to illustrate certain embodiments of the present disclosure, but do not exemplify the full scope of the disclosure.

Example: Multi-Staged Surface Integrated (MSI) Thruster

The drag savings achievable using MSI thrusters can be estimated using an example based on the prior art aircraft embodiment of FIG. 1. The prior art aircraft of FIG. 1 for this example will be referred to as the "V2 aircraft". Additionally, the ion sources and ion collectors that may be provided in a stage of an MSI thruster arrangement will also be referred to herein as "emitter" and "collector", respectively. The V2 aircraft had a wingspan of 5.0 m and eight thrusters each having a wingspan of 3 m, yielding a total of 24 m of thrusters. Design dimensions of the V2 aircraft were used to estimate drag savings. The V2 aircraft had a mass of 2.18 kg and an estimated total drag in cruise of 2.38 N. of which 1.0 N was from the thruster array. The resulting lift-to-drag ratio was 9.4.

If the V2 wing were to serve as a dual-stage MSI thruster, it would have a span of 10 m (twice the wingspan). Accordingly, 10 m of exposed thruster could be eliminated. However, the MSI thruster would still use 5 m of exposed emitter and 5 m of exposed collector, so the net effect on drag would be to eliminate 5 m of exposed thruster (from the emitter and collector). The effect on total drag of the aircraft can then be estimated as $$\Delta D_{aircraft} = D_{thruster} \frac{\Delta L_{thruster}}{L_{thruster}}$$

where $\Delta D_{aircraft}$ is the change in drag of the entire aircraft, $D_{thruster}$ is the drag of the original thruster array (1.0N), $\Delta L_{thruster}$ is the change in length of the thruster array (5 m), and $L_{thruster}$ is the length of the original thruster array (24 m). The resulting drag reduction was 0.21 N, an 8.7% reduction relative to the total drag of the aircraft. The lift-to-drag ratio was therefore increased by 9.6%, to a value of 10.3. A relevant metric to analyze is endurance of the aircraft, which quantifies the amount of time an aircraft can remain in flight. Since endurance of an electric aircraft is linearly related to its lift-to-drag ratio, this corresponds to an endurance improvement due to the use of an MSI thruster of just under 10% for the above configuration.

In reality, the endurance advantage of MSI may be greater than the 10% value calculated above for the following two reasons. Firstly, the MSI thruster's first-stage collector (i.e. the wing) is much larger and thicker than the exposed collectors depicted in the prior art wing and thruster arrangement of FIG. 2. Since larger collectors give better thruster performance, even more exposed thrusters can be eliminated, resulting in a further endurance increase. Secondly, the above calculations assume a retrofit to an existing airframe. If an entirely new airframe were designed to take advantage of MSI technology, further gains may be possible. For example, if the wingspan were increased, more span is available for MSI thrusters, resulting in even fewer exposed thrusters and an endurance benefit. Similar benefits can be achieved by optimizing other aircraft parameters, such as the size of the side struts (which can be smaller and lighter due to the reduced exposed-thruster array size: see FIG. 1).

Example: Thruster Performance

This example illustrates experiments that were conducted on an airframe with a biplane configuration (see FIG. 4) which contained two sets of wings in parallel separated by a vertical distance of 35 cm. Each of the wings had a span of 3.5 m, a root chord of 21.3 cm, a tip chord of 10.7 cm and an Aquila 93 airfoil profile. 30% of the wing's chord was coated in aluminum foil near the leading-edge of the wing to act as a collector. The second stage collectors were HT14 airfoils with a span of 3.5 m, a uniform chord of 5 cm, and 60% of their chord was coated in aluminum foil. The first-stage emitters were placed 11.7 cm upstream of the wing's leading edge, and the leading-edge of the second stage collectors were 11.7 cm downstream of the wing's trailing-edge. The emitters were 36 AWG tungsten wires and the second stage emitters were adjacent to the wing's trailing-edge. Within this example, the second stage collectors were not a lifting surface. The first stage emitters and the second stage collectors were connected to the output of a DC positive power supply, while the first stage collectors and the second stage emitters (integrated into the main wings) were grounded. This arrangement resulted in a positive corona discharge in the first stage, and a negative corona discharge in the second stage.

Figure 6A:
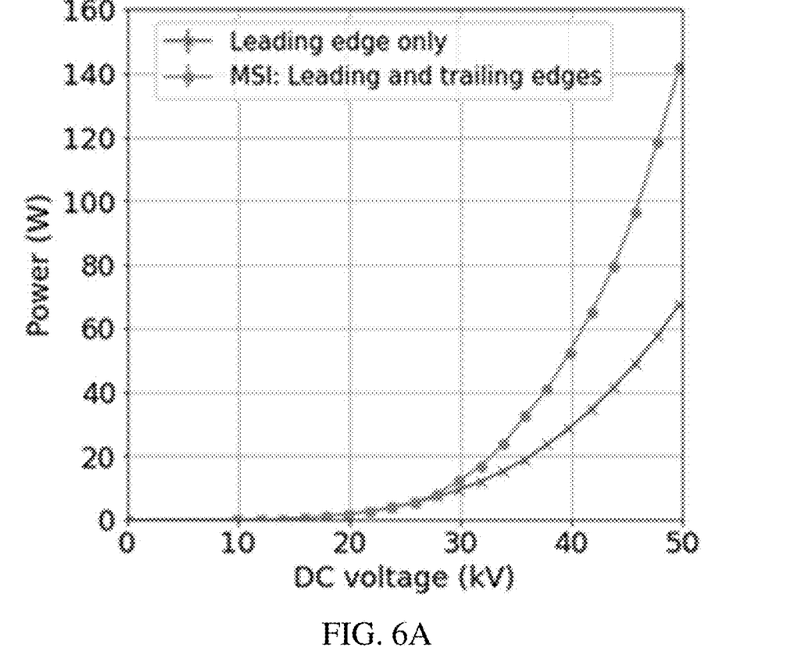
FIG. 6A presents simulated thruster properties of electroaerodynamic devices, according to some embodiments.
Figure 6B:
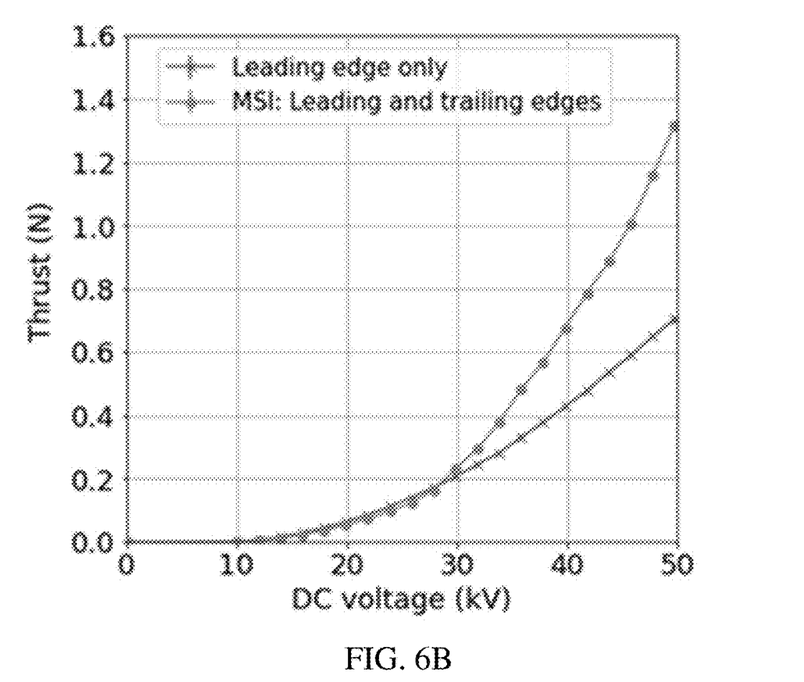
FIG. 6B presents simulated thruster properties of electroaerodynamic devices, according to some embodiments.

FIGS. 6A and 6B show the power draw and the thrust produced by the aircraft's thrusters in two configurations. In the first case, only the first (leading-edge) stage of the thruster was connected. In the second case, both stages were connected in an MSI thruster arrangement. The results show that at voltages above 28 kV, the two-stage MSI device produces more thrust and draws more power than the single-stage case. At 50 kV, the MSI thruster produces 87% more thrust than the single-stage case. These results show the advantages of MSI thrusters. Specifically, the thrust of a stage is approximately additive, but by integrating the thrusters into the wings, the external first-stage collectors have been eliminated (reducing mass and drag), and the drag of the second stage emitters has been reduced.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. An electroaerodynamic thruster comprising:
a first airfoil;
a first electrode integrated with the first airfoil; and
a second electrode spaced from the first airfoil, wherein the first electrode is configured to function as one of an ion source and an ion collector, and wherein the second electrode is configured to function as the other of the ion source and the ion collector, wherein the first electrode and second electrode are further configured to generate thrust by accelerating ions between the first electrode and second electrode, wherein the first airfoil is a lifting surface, and wherein the ion source is positioned within a wake of the first airfoil during operation.

2. The electroaerodynamic thruster of claim 1, further comprising a second airfoil, wherein the second electrode is integrated with the second airfoil.

3. The electroaerodynamic thruster of claim 1, wherein ion generation by the ion source is at least partially decoupled from ion acceleration by the ion collector.

4. The electroaerodynamic thruster of claim 1, further comprising a third electrode disposed downstream from the first electrode and the second electrode.

5. An electroaerodynamic thruster comprising:
a plurality of serially arranged electroaerodynamic stages, wherein each stage of the plurality of electroaerodynamic stages includes:
an ion source; and an ion collector, wherein at least one of the ion source and the ion collector are integrated in one or more airfoils, and wherein the ion source and ion collector are configured to accelerate ions between the ion source and ion collector to create thrust, wherein the ion sources and the ion collectors of adjacent electroaerodynamic stages are integrated in separate airfoils.

6. The electroaerodynamic thruster of claim 5, wherein an ion polarity of each stage of the plurality of electroaerodynamic stages is opposite from an ion polarity of an adjacent stage of the plurality of electroaerodynamic stages.

7. The electroaerodynamic thruster of claim 5, wherein ion generation by the ion source of at least one electroaerodynamic stage is at least partially decoupled from ion acceleration by the ion collector of the at least one electroaerodynamic stage.

8. The electroaerodynamic thruster of claim 5, wherein an ion source from a first electroaerodynamic stage of the plurality of electroaerodynamic stages is integrated with a first airfoil and an ion collector from a second electroaerodynamic stage of the plurality of electroaerodynamic stages is integrated with the first airfoil.

9. The electroaerodynamic thruster of claim 5, wherein an airfoil of at least one electroaerodynamic stage of the plurality of electroaerodynamic stages is a lifting surface.

10. The electroaerodynamic thruster of claim 5, wherein the ion source is positioned within a boundary layer of an airfoil of at least one electroaerodynamic stage of the plurality of electroaerodynamic stages, and wherein a location of the boundary layer is variably dependent on at least one of an altitude and a velocity of a cruise condition.

11. A method of thrust generation using an electroaerodynamic thruster, the method comprising:
applying a first voltage differential between a first electrode integrated with a first airfoil and a second electrode spaced apart from the first electrode;
generating ions at one of the first electrode and the second electrode;
generating thrust with the first electrode and the second electrode by accelerating the ions in a downstream direction with the first voltage differential applied between the first electrode and the second electrode; and
generating lift with the first airfoil, wherein the second electrode is positioned to be within a wake of the first airfoil during operation.

12. The method of claim 11, wherein the second electrode is integrated with a second airfoil.

13. The method of claim 12, further comprising generating lift with the second airfoil.

14. The method of claim 11, wherein the ions are generated at the first electrode, and the ions are accelerated from the first electrode towards the second electrode in the downstream direction.

15. The method of claim 11, wherein generating the ions includes generating the ions using dielectric barrier discharge.

* * * * *